(12) United States Patent
Matich (10) Patent No.: US 6,224,706 B1
(45) Date of Patent: May 1, 2001

(54) METHOD OF MAKING A LAYERED STRUCTURAL ARTICLES

(75) Inventor: Frank Anthony Matich, New South Wales (AU)

(73) Assignee: Armacel Pty. Limited, New South Wales (AU)

(*) Notice: Subject to any disclaimer, the term of this patent is extended or adjusted under 35 U.S.C. 154(b) by 0 days.

This patent is subject to a terminal disclaimer.

(21) Appl. No.: 09/029,532

(22) PCT Filed: Aug. 30, 1996

(86) PCT No.: PCT/AU96/00541

§ 371 Date: Feb. 27, 1998

§ 102(e) Date: Feb. 27, 1998

(87) PCT Pub. No.: WO97/09166

PCT Pub. Date: Mar. 13, 1997

(30) Foreign Application Priority Data

Sep. 1, 1995 (AU) .................................................. PN5167

(51) Int. Cl.[7] ........................... B29C 65/00; B32B 31/20
(52) U.S. Cl. .................... 156/212; 156/213; 156/214; 156/215; 156/216; 156/285; 156/286; 156/282; 362/382; 428/73; 428/99; 428/76; 428/71; 428/74; 428/68; 428/131; 428/137; 428/138
(58) Field of Search .................................. 428/73, 99, 76, 428/71, 74, 68, 131, 137, 138; 156/212, 213, 214, 215, 216, 285, 286; 362/382

(56) References Cited

U.S. PATENT DOCUMENTS

| | | | |
|---|---|---|---|
| 3,929,536 | * 12/1975 | Maughan | 156/85 |
| 4,024,309 | * 5/1977 | Pender | 428/69 |
| 4,337,116 | * 6/1982 | Foster et al. | 162/158 |
| 4,880,588 | 11/1989 | Brault et al. | 264/163 |
| 4,980,214 | * 12/1990 | Charriere | 428/68 |
| 5,051,144 | * 9/1991 | Kistner | 156/85 |
| 5,201,981 | * 4/1993 | Whiteside | 156/212 |
| 5,252,164 | * 10/1993 | Mills | 156/212 |
| 5,346,571 | * 9/1994 | Condon et al. | 156/212 |
| 5,833,796 | * 11/1998 | Matich | 156/285 |

FOREIGN PATENT DOCUMENTS

| | | |
|---|---|---|
| 68979 | 2/1995 | (AU) . |
| 361823 | 4/1990 | (EP) . |
| 389456 | 9/1990 | (EP) . |
| 2103468 | 2/1983 | (GB) . |
| WO9117040 | 11/1991 | (WO) . |
| WO9323236 | 11/1993 | (WO) . |
| WO9523682 | 9/1995 | (WO) . |

\* cited by examiner

Primary Examiner—William P. Watkins, III
(74) Attorney, Agent, or Firm—Leydig, Voit & Mayer, Ltd.

(57) ABSTRACT

Structurally strong articles are formed from inherently weak materials, such as expanded polystyrene, coated with one or more layers of a thermoplastic sheet material, such as amorphous polyethylene terephthalate. The inherently weak interior members are either fluid permeable or perforated. These members are sandwiched or encapsulated by heat deformable outer layers. The articles are made by applying a fluid pressure between the stack of interior members and the thermoplastic sheet, with the thermoplastic sheet heated to conform to the interior members. The fluid pressure is maintained until the thermoplastic sheet is cooled so that tension extending in all directions is produced in the sheet. The resulting articles are useful as building elements, signs, motor vehicle panels, pallets, surf boards, and sail boards.

13 Claims, 8 Drawing Sheets

METHOD OF MAKING A LAYERED STRUCTURAL ARTICLES

The present invention relates to fabrication of inherently strong articles from inherently weak materials and is directed to a modification to, or improvement in, the subject matter disclosed in International Patent Application No. PCT/AU95/00100 assigned to the present applicants which is unpublished as of the priority date of this application. The contents of that international patent application are hereby incorporated into the present specification by cross-reference.

BACKGROUND INFORMATION

The disclosure of the above-mentioned PCT application is essentially concerned with the fabrication of structurally strong articles from an inherently weak material such as expanded polystyrene (EPS) which is coated with one or more layers of a thermoplastic sheet material such as APET (amorphous polyethylene terphalate). By themselves such materials have a negligible strength, however, by carrying out the processes described in the above-mentioned PCT specification, a structural article of very substantial strength can be fabricated. Some examples of various structural articles are disclosed in that PCT specification.

The object of the present invention is to further improve upon the above-mentioned disclosures, in particular by the provision of a number of interior members each of either inherently fluid permeable or perforated to become fluid permeable. The interior members are provided, for example for the purposes of decoration and/or additional strength and/or their individual properties, and are sandwiched or encapsulated by the heat deformable outer layer(s).

SUMMARY OF THE INVENTION

In accordance with a first aspect of the present invention there is disclosed a method of forming a layered structural article having load bearing capabilities formed from a plurality of shape defining interior members and at least one external skin, each of said plurality of shape defining interior members being not inherently load bearing and being at least partially fluid permeable, said method comprising the steps of:

(1) locating said plurality of members one above the other to form a stack;

(2) heating a thermoplastics sheet intended to form said external skin;

(3) moving said heated sheet relative to said stack to bring the heated sheet into a position overlying said stack;

(4) applying a fluid pressure differential between that side of said sheet remote from said stack and that side of said stack remote from said sheet, to compress the members of said stack and conform said sheet to the shape of said compressed stack and mutually engage said sheet and compressed stack, air initially trapped between said stack and sheet and within said stack passing through said stack; and (5) cooling said thermoplastics sheet, or allowing same to cool, whereupon tensional forces arise in said sheet in all directions.

In accordance with a second aspect of the present invention there is disclosed a layered structural article having load bearing capabilities formed from a plurality of shape defining interior members located one above the other to form a stack, each of said plurality of members being not inherently load bearing and being at least partially fluid permeable, said stack being at least partially encapsulated by at least one sheet of thermoplastic material which compresses said members of said stack together and conforms to the compressed shape of said stack.

DESCRIPTION OF THE DRAWINGS

Embodiments of the present invention will now be described with reference to the drawings in which.

DETAILED DESCRIPTION

Figure 1:
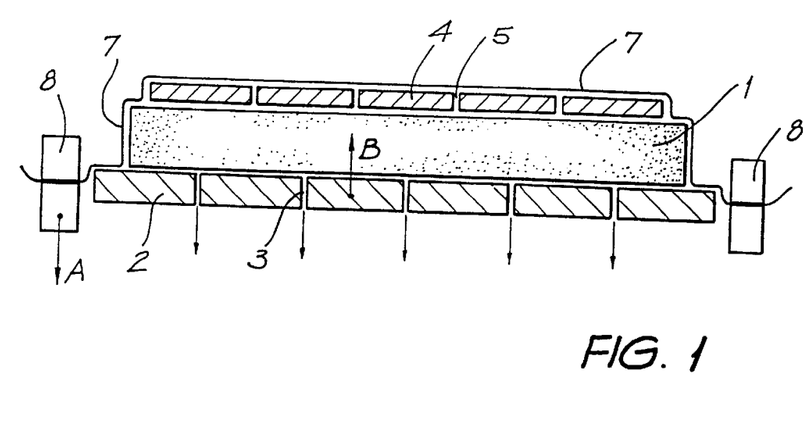
FIG. 1 is a schematic cross-sectional view through a multi-layer structural article in accordance with a first embodiment.

In the arrangement illustrated in FIG. 1, a block 1 of essentially air permeable material such as expanded polystyrene (EPS) is placed above a base plate 2 which has a series of small holes 3 therethrough and which essentially functions to support the block 1. Positioned above the block 1 is a perforated layer of impermeable material 4 having perforations 5 therethrough.

Overlying both the block 1 and the material 4 is a sheet 7 of APET, the periphery of which is clamped to the base plate 2 by means of a clamp 8.

With the block 1 in position above the base plate 2, and the layer of impermeable material 4 in position above the block 1, the sheet 7 is heated by means of a heater (not illustrated) until at least soft or plastically deformable, and is then located over the assembled block 1 and material 4 and clamped between a pair of clamping rings 8 as illustrated. Either the clamps 8 are moved downwardly in the direction of arrow A, or the base plate, block 1, and material 4 are moved upwardly in the direction of arrow B, or both. Then the air or gas located between the sheet 7 and the base plate 2 is drawn out from beneath the sheet 7 so as to conform the sheet 7 to the shape determined by the block 1 and material 4. This is similar to vacuum forming but is significantly different in that the block 1 is permeable and therefore air which is located between the material 4 and the block 1 is able to pass through the block 1 and out the holes 3 as indicated by the arrows in FIG. 1.

Furthermore, since the layer of impermeable material 4 is not able to conduct such air, the perforations 5 are located within the material 4 in order to permit the air located between the sheet 7 and the material 4 to pass through the perforations 5 and thence through the block 1 and out via the holes 3. As explained in the above-mentioned PCT specification, the removal of the air can be brought about by applying a reduced pressure or vacuum to the holes 3, by applying a positive pressure to the upper side of the sheet 7, or by both methods simultaneously. The pressure difference is applied for a sufficient length of time for the sheet 7 to cool and thereby adopt a final position which is conformed to the shape of the block 1 and material 4 and which binds them together by the creation of tensional forces in the sheet 7 in all directions. After the release of the clamp 8, the edges of the sheet 7 can be trimmed so as to have the same periphery as the block 1. In this connection it will be appreciated that the clamp 8 extends all the way around the periphery of the block 1 in order to provide an effective seal together with the base plate 2.

Various types of impermeable material 4 can be used including ABS plastic sheet, metal sheet and metal foils. Where an impermeable material 4 is used then perforations or vents are provided in order to permit air located between the sheet 7 and the material 4 to be evacuated via the block 1 and holes 3. However, it is not necessary that the material 4 be impermeable since such permeable material as thin timber veneers, sheets of cardboard, or like cellulosic materials, can also be used in which case the material is sufficiently permeable that the perforations 5 are not required.

Furthermore, if desired a bonding agent such as heat or pressure sensitive adhesive, can be located between the material 4 and block 1 and/or between the material 4 and sheet 7.

Figure 2:
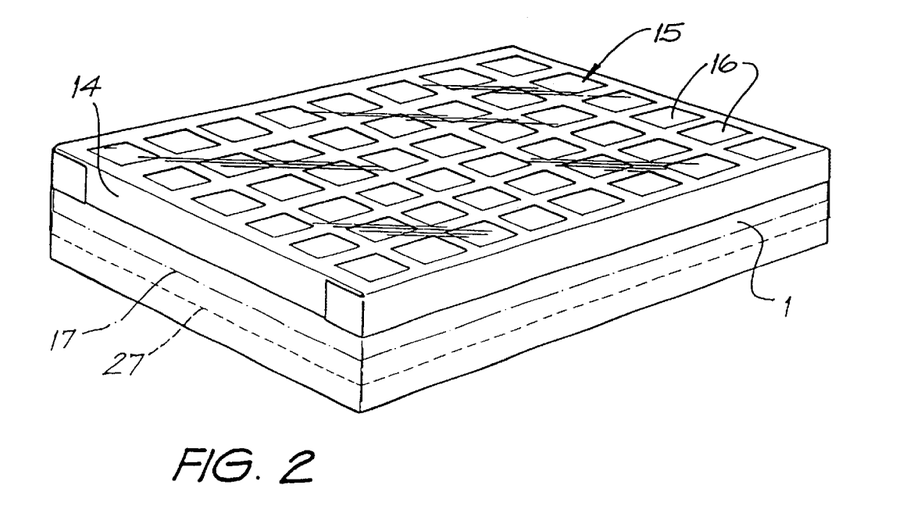
FIG. 2 is a schematic perspective view of a metal reinforced structural article in accordance with a second embodiment.

In a similar embodiment illustrated in FIG. 2, the block 1 is essentially as before, however, the sandwiched material takes the form of cap 14 fabricated from sheet metal and having a regular array 15 of rectangular apertures 16 punched in the upper surface of the cap 14. The side edges of the cap 14 are folded over so as to neatly fit the periphery of the block 1.

As indicated by means of a dot dash line in FIG. 2, the underside of the block 1 is preferably first coated with a first sheet 17 in a manner analogous to that described above in FIG. 1 and in the above-mentioned PCT specification. Then the sheet 17 is perforated on the underside of the block 1 so as to enable a second sheet 27 to be conformed to the upper surface of the block in the manner indicated in FIG. 1 above and in the above-mentioned PCT specification. The second sheet 27 is trimmed to have an edge indicated by means of broken lines in FIG. 2 so that the upper sheet 27 overlaps the lower sheet 17. If desired the order of the application of the sheets 17 and 27 can be reversed in which case it is the upper sheet 27 which is perforated.

The result is an exceptionally strong structural article in which the cap 14 is provided with a rigidity far in excess of that which one would expect from sheet metal having a thickness of the order of 1 mm and into which fasteners, such as self-tapping screws (not illustrated) can be inserted. Thus the article in FIG. 2 finds particular application as a cool-room door, or wall panel, where physical abuse or abrasion is a consequence of the use to which the article is put. Another application is as an advertising sign in which the cap 14 forms the rear side of the sign and the underside of the block 1 as illustrated in FIG. 2 forms the front face of the side. To this front face can be adhered, for short periods, paper advertisements which are changed at regular intervals. Not only is the sign inexpensive to construct, and able to withstand strong loads caused by high winds, but the sign itself is entirely coated with sheet plastics material such as APET which can be formulated to be resistant to weathering, does not require painting and so on.

Figure 3:
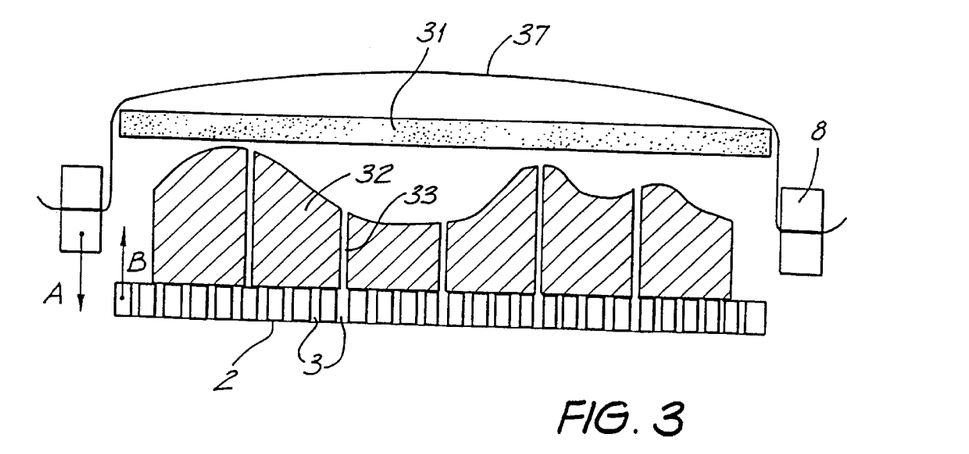
FIGS. 3 and 4 are views similar to FIG. 1 but illustrating the process of forming a shaped structural article in accordance with a third embodiment.
Figure 4:
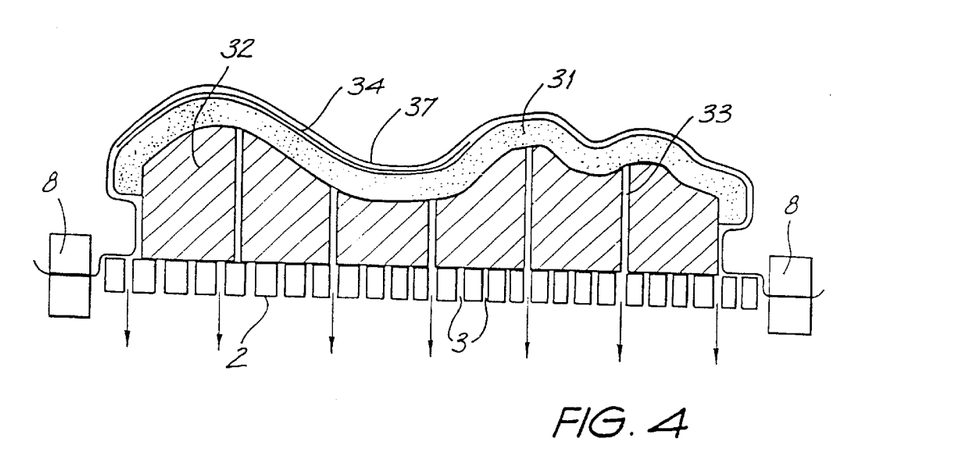

Turning now to FIGS. 3 and 4, these drawings illustrate sequential steps in a similar process in which a regularly shaped block 31 as before is intended to be conformed to an irregularly shaped final configuration. In this connection an irregularly shaped formed 32 having holes 33 is supported on a perforated base plate 2. The block 31 is covered by means of a sheet 37 and clamp 38 in the same general manner as described above in relation to FIG. 1 and in the above-mentioned PCT specification. However, during the application of the pressure difference between the sheet 37 and the base plate 2 so as to evacuate the air from between the base plate 2 and the sheet 37, the block 31 conforms to the profile of the former 32. Provided the former 32 does not have any particularly sharp corners, the EPS or similar material of the block 1, particularly whilst warmed by the heated sheet 37 to some extent, is able to conform to the profile of the former 32. If necessary heat can be applied whilst the pressure is also exerted.

Since the vacuum is applied to the holes 3 of the base plate 2, and/or the positive pressure is applied to the upper surface of the sheet 37, whilst the sheet 37 is cooling into its final position, once the vacuum or pressure is released after the cooling has been completed, the block 31 remains in the final conformation illustrated in FIG. 4. As also illustrated in FIG. 4, if desired a decorative material, such as a perforated aluminum foil, 34 can be sandwiched between the sheet 37 and the block 31. The inner surface of the sheet 37 can also be printed or painted.

It will be appreciated that in FIG. 3 the starting material is the regularly formed block 31 which is conformed during the manufacturing process to adopt the irregular profile of the base plate 32. However, it is not necessary that the block 31 be a rectangular slab to commence. In particular, the block 31 can be moulded to an intermediate form which is easily able to be extracted from the mould and in which the final intended form would not be easily able to be extracted from the mould. Under these circumstances, the former 32 can be provided with the final desired profile and the pre-shaped moulded block 31 can be shaped to the desired final form during the manufacturing process. This enables inexpensive and uncomplicated moulds to be used for the initial moulding step thereby reducing overall costs.

It will also be apparent to those skilled in the art that the former 32 can be porous—for example being fabricated from sintered or aerated brass, rather than have holes 33. Also compressed air applied to the former 32 can be used to blow the finished article free of the former 32.

Figure 5:
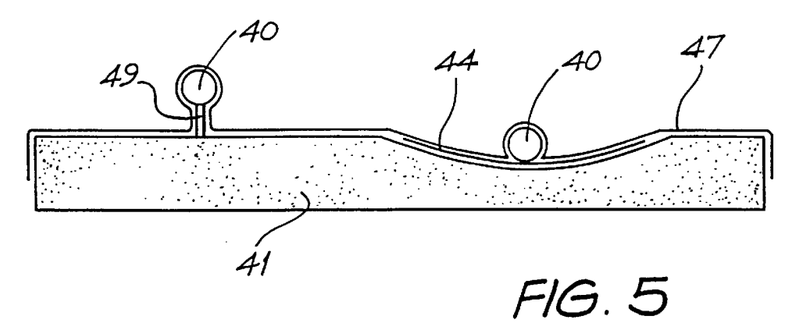
FIG. 5 is a cross-sectional view through an advertising sign including a light.

Turning now to FIG. 5, in the manufacture of advertising signs, and in particular, those advertising sign including gas discharge lamps such as neon lights, it is necessary for the glass tubing of the gas discharge lamp to be supported. With a neon light, the light itself may be of very substantial dimensions often covering a surface area of several square meters. Thus the framework required to support the glass tubing, particularly against high wind loadings, is both of substantial size and a substantial weight. This framework has hitherto been fabricated at some expense and over a considerable period of time.

In the arrangement shown in FIG. 5, the support for the neon light 40 takes the form of a block 41 covered by a sheet 47 as before. If desired, the glass 40 can be supported by spaced apart pillars 49. In FIG. 5 a small gap is illustrated between the glass 40, block 41, pillar 49 and sheet 47 in order to make the sheet 47 apparent. However, the sheet 47 actually conforms exactly to the outer surface of the neon light 40, block 41 and pillar 49 and therefore no such gap exists in actuality. In particular, the sheet 47 lies against the glass of the neon light 40 and is entirely transparent. As a consequence the light emitting capacity of the neon light 40 is not impaired. Quite the reverse, as illustrated in FIG. 5 the block 41 can be shaped so as to provide a reflective surface to the rear of the neon light 40 and, in particular, a reflective aluminium foil 44 can be positioned behind the neon light 40, if desired, so as to very substantially enhance the light emitting properties thereof. As before, the aluminium foil 44 is preferably provided with a multiplicity of tiny perforations (not illustrated). Typically such perforations have a size or diameter of the order of 0.1 mm and are entirely invisible to the casual observer.

Figure 6:
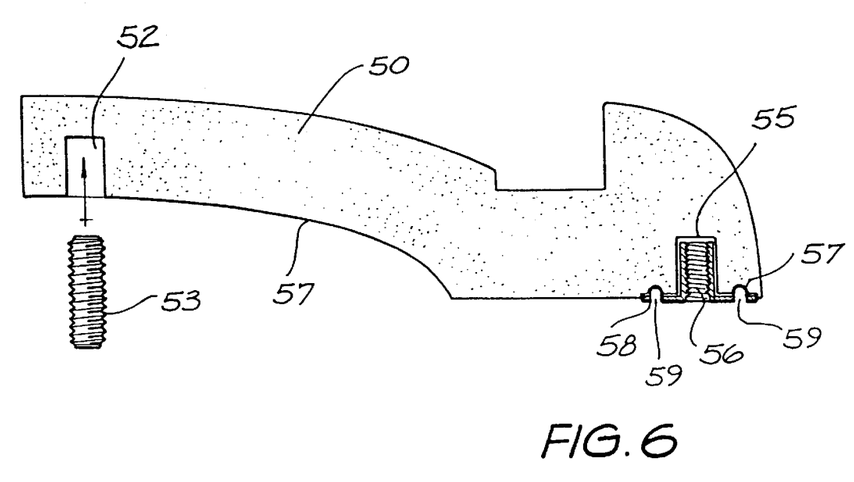
FIG. 6 is a cross-sectional view through an automotive part illustrating two different methods of securing fixing fittings.

As seen in FIG. 6, a portion of a dashboard, such as a knee bolster, used in the fabrication of automobiles is illustrated. The bolster 50 is formed from GECET (Registered Trade Mark) a blend of polyphenylene oxide and polystyrene impregnated with pentane, essentially a high grade form of expanded polystyrene or similar material, and is preferably coated with two layers of sheet material 57 thereby providing a "class A finish" to automotive industry standards for body panels. Two methods of securing fixing fittings are illustrated. In the first method a blind hole 52 is formed in the bolster and the sheet 57 extends down the sides and into the base of the blind hole 52. Into this aperture is able to be screwed a threaded stud 53 which has a length approximately twice the depth of the blind hole 52. The external threads on the stud 53 are able to grip the material of the sheet 57 and thus provide a firm anchorage. A nut (not illustrated) or similar arrangement is then used to secure the stud to the vehicle chassis, for example.

In an alternative arrangement, a similar blind hole 55 has an internally threaded boss 56 inserted therein where it is initially secured in position by means either of a frictional fit and/or by gluing. The boss 56 has a flange 58 having small openings 59. The sheet 57 is then applied and covers the boss 56 with portions of the sheet 57 being drawn into the openings 59 to lock the boss into position. Then the sheet 57 covering the threaded aperture of the boss 56 is cut or otherwise ruptured. The internally threaded boss 56 is then able to receive a threaded fastener shank, or similar, as a means of fixing the bolster 50.

Figure 7:
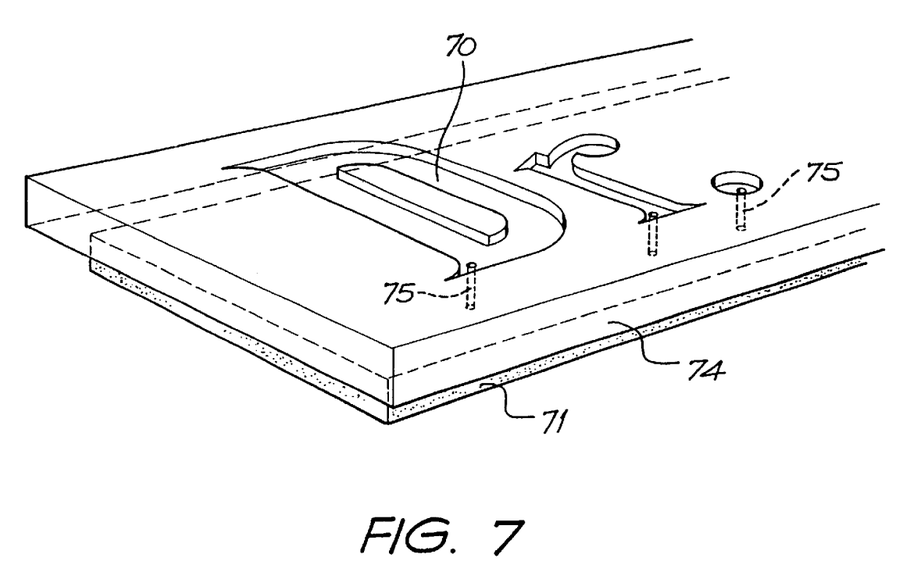
FIG. 7 is a schematic and partial perspective view of a brass plate such as used at doctor's premises.

In FIG. 7 a still further embodiment is illustrated. Here a brass plate 74 such as used to advertise the presence of a doctor's rooms or surgery, is engraved with letters 70. Previously such plates would tarnish and thus would have to be polished at regular intervals. However, by coating the plate 74 by a suitable layer of clear plastics sheet material this task is avoided. Essentially the plate 74 becomes the material 4 of FIG. 1, the plate 74 being positioned above a slightly smaller permeable block 71. No glue or other adhesive is used between the plate 74 and block 71. Also small perforations or drill holes 75 are located in each of the depressions formed by the letters 70. This enables air between the covering sheet (not illustrated) and the plate 74 to be evacuated. The covering sheet is then applied and after cooling is scored around the periphery of the block 71 against the underside of the brass plate 74. This cuts the covering sheet and enables the block 71 to be removed. The result is a highly reflective polished brass name plate which will not tarnish since it is protected from the elements by the covering layer.

In the alternative, the block 71 can be retained as a backing member.

Figure 8:
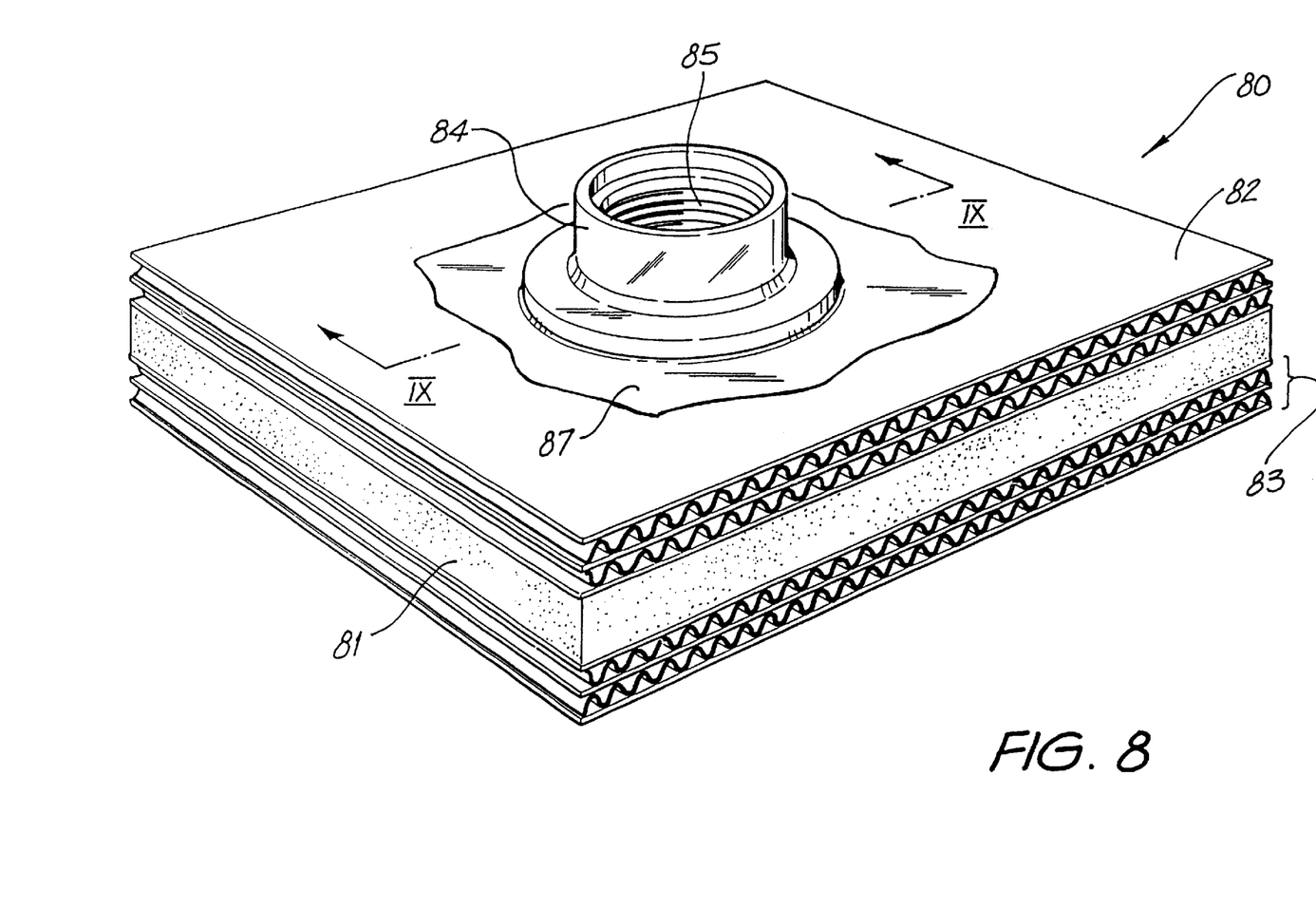
FIG. 8 is a perspective view of a multi-layered article having a secured fixing member.

As seen in FIG. 8, the layered structural article of the present invention can, in a still further embodiment, consist of a panel 80 formed from a laminate of a central layer 81 of expanded polystyrene (EPS) positioned between two outer layers 82, 83 formed from paper fabricated as cardboard. The outer layers 82, 83 are each illustrated as formed from three flat sheets and two layers of corrugations. Those skilled in the art of cardboard manufacture will be aware that other combinations such as four flat sheets and three layers of corrugations are possible.

As before the panel 80 is coated with one or more layers of the sheet material 87 which is illustrated in FIG. 8 in cut away fashion to reveal the interior of the panel 80. The result is a structurally strong panel 80 formed from inherently weak materials such as EPS and cardboard. Since cardboard is not strong, is badly affected by moisture and is not regarded as a food grade material, the resulting panel finds many uses since it is structurally strong, is water and liquid impervious, and the sheet material can readily be made to food grade quality.

Furthermore, in articles made hitherto from paper or cardboard, securing any type of fitting is extremely difficult. Any attempt to glue a fitting results in the outmost sheet of cardboard either tearing or de-laminating at low applied forces so a very weak fitting results. Similarly any attempt to use screw fasteners such as a self tapping screw merely results in the fastener tearing from the cardboard material.

However, these problems with the prior art are overcome in accordance with the present invention by the encapsulation of a female threaded fitting 84 (such as a conventional plumbing fitting) underneath the sheet material 87. The fitting 84 can be fabricated from plastics such as PVC or polypropylene or from metal such as brass or galvanised iron. In the event that a metal fitting 84 is used, during the application of the sheet material 87 the fitting 84 is preferably heated prior to the heated sheet 87 coming onto contact with the fitting 84 as the pressure differential is applied. This prevents the fitting 84 absorbing heat from the sheet 87 and thereby preventing proper flow of the softened sheet 87.

Figure 9:
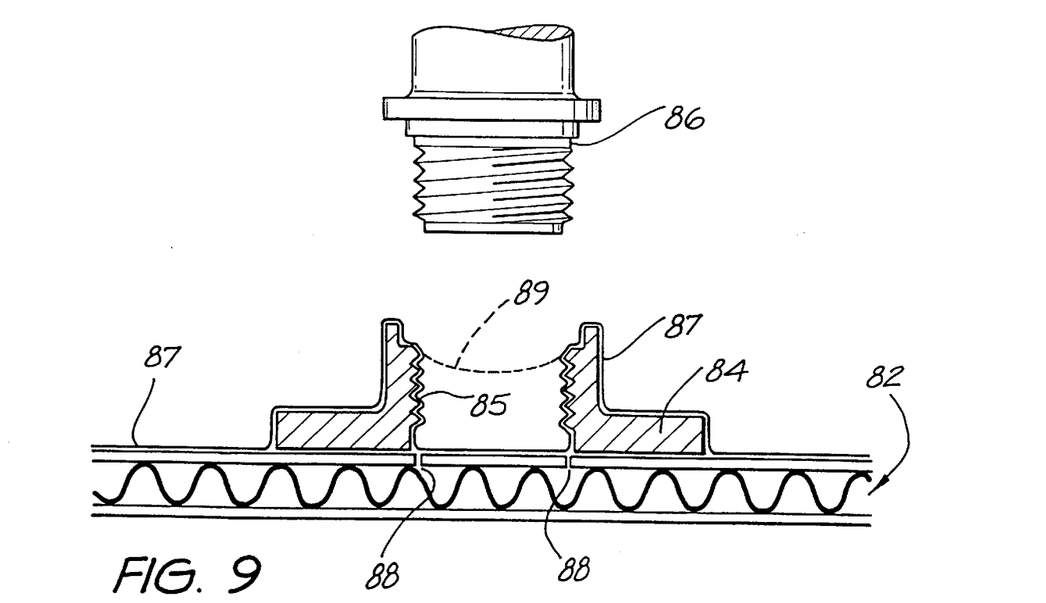
FIG. 9 is a partial cross-sectional view along the line IX—IX of FIG. 8.

As seen in cross-section in FIG. 9 (only the upper portion of cardboard layer 82 being illustrated therein) the heated sheet material 87 adheres tightly to the outer surface of the outer cardboard layer 82 and to the exterior surfaces of the fitting 84. The provision of two apertures 88 in the outer sheet of cardboard allow air to be conducted from within the area adjacent the threads 85 of the fitting 84, through the outer layer of cardboard and into the uppermost corrugated layer from whence it can be easily evacuated. This results in the sheet material 87 being drawn down tightly into the threads 85 and into close contact with the upper surface of the layer 82. In this connection it should be borne in mind that a gap is illustrated between the sheet material 87 and the remaining layer 82 and fitting 84 which does not exist in reality.

The tight adhesion of the sheet material 87 to the threads 85 means than an externally threaded male fastener 86, or similar, can be screwed into the fitting 84 to make a strong mechanical connection to the panel 80. Even though the sheet material 87 as drawn into the threads 85 is very thin, the thickness can be enough to modify the pitch of the threads 85 and this needs to be taken into account in selecting the pitch of the male fastener 86.

In the alternative, if the apertures 88 are not present, the sheet material 87 will only by partially drawn into the threads 85 as indicated by the broken line 89 in FIG. 9. Under these circumstances, the sheet material occluding the opening of the fitting 84 can be cut away to enable proper engagement by the male fastener 86. This is similar to the threaded boss 56 of FIG. 6. Irrespective of which arrangement is selected, the sheet material 87 holds the fitting 84 tightly to the strong panel 80 and results in a strong and versatile fixing arrangement.

Figure 10:
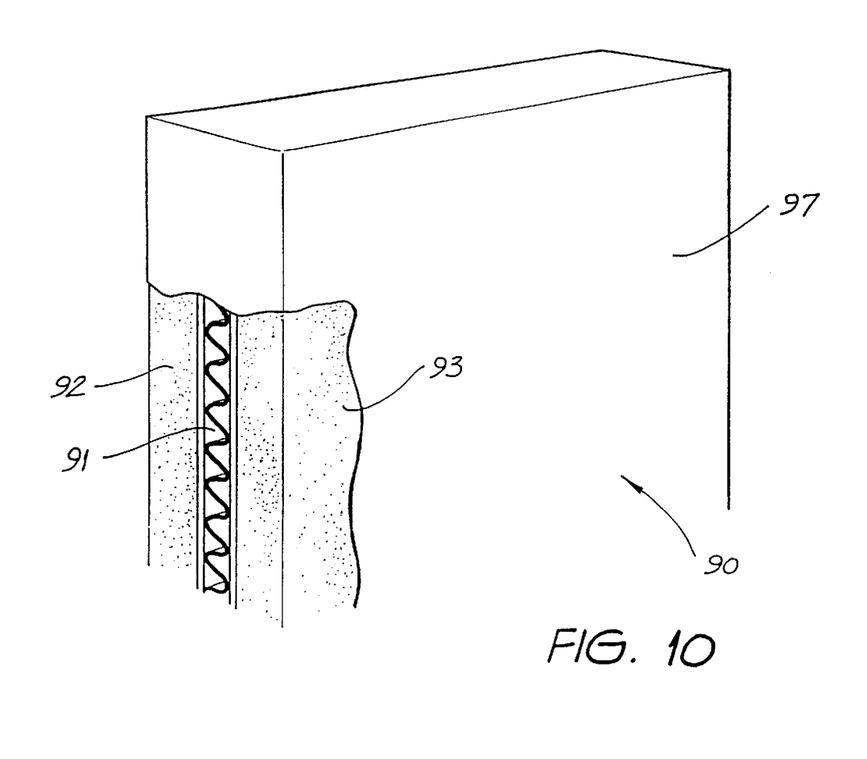
FIG. 10 is a cut away view of a three layered article.

A further embodiment is illustrated in FIG. 10. Here a panel 90 is provided with an external skin of sheet material 97 as before. Part of the sheet material 97 is cut away to reveal the interior of the panel 90 which consists of two outer foam layers 92, 93 formed from EPS or GECET, for example, and a central layer 91 formed from cardboard. Although only a single corrugated layer for the central layer 91 is illustrated in FIG. 10, it will be clear that the central layer 91 can be made up from many cardboard layers if desired. Also two cardboard layers and one EPS layer therebetween can be provided, if desired.

The arrangement of FIG. 10 finds particular application as a wall material for refrigerators, cool rooms and the like.

Figure 11:
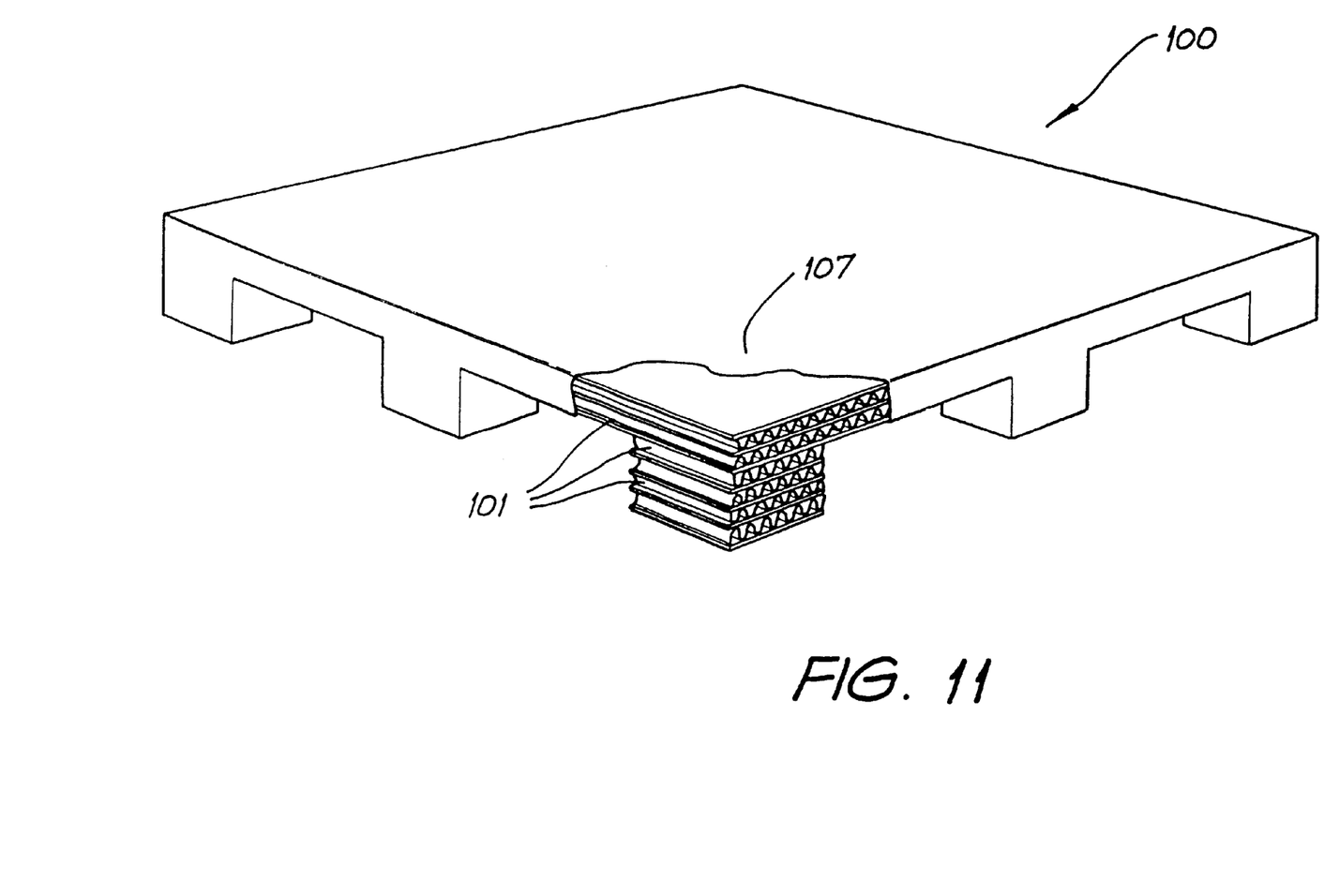
FIG. 11 is a perspective view of a pallet formed from multiple layers of cardboard.

A still further embodiment of the present invention is illustrated in FIG. 11. Here a pallet 100 is formed from entirely recycled materials. The shape of the pallet 100 is fabricated from a plurality of cardboard layers 101 stacked one above the other. The cardboard is encapsulated in sheet material 107 as before which is preferably formed from recycled polyethylene terephthalate (PET) obtained from re-cycled soft drink bottles. Thus the strength of the pallet 100 arises from the tensional forces created in all directions in the sheet material 107 as it cools whilst the shape of the pallet 100 is determined from the shape, thickness and number of layers 101 of the cardboard. Both materials are low cost and light weight and the resulting pallet 101 is itself recyclable. As before, a portion of the sheet material 107 is cut away in FIG. 11 to reveal the cardboard layers 101 of the interior of the pallet.

Figure 12:
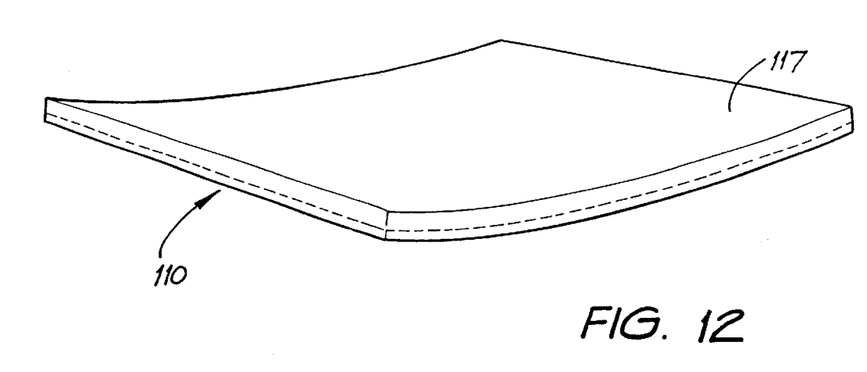
FIG. 12 is a perspective view of a curved panel the result of a lack of compensation.

Since the sheet material 7, 17, 27, 37, 47, 57, 87, 97, 107 etc. contracts as it cools and thereby applies tensional forces in all directions, the cooling sheet material tends to contract, bend or distort the underlying object. This is illustrated in FIG. 12 which shows the result of the sheet material 117 being applied to the upper surface only of a rectangular slab 110 of foam material such as EPS. In the application of the sheet material 117 the slab 110 was placed on a flat base such as base plate 2 in FIG. 1.

Whilst applying a further layer of sheet material to the underside of the slab 110 would to some extent correct this problem by means of a balance of forces, it is not always desirable or practical to do this.

Figure 13:
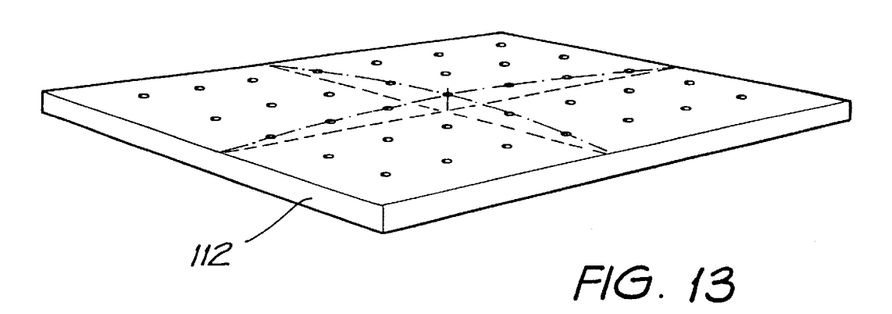
FIG. 13 is a perspective view of a generally domed base plate which provides adequate compensation.

Instead, as illustrated in FIG. 13, it is better to provide compensation by shaping a perforated base plate 112 so as to have a slightly raised centre. In addition, the pressure differential or vacuum is applied for a long time until after the sheet material 7, 17, 27, 37, 47, 57, 87, 97, 107 etc. has cooled. In this way the shape of the base plate 112 counteracts, or compensates for, the distorting effect of the tensional forces created by the cooling and shrinking sheet material 7, 17, 27, 37, 47, 57, 87, 97, 107 etc.

Figure 14:
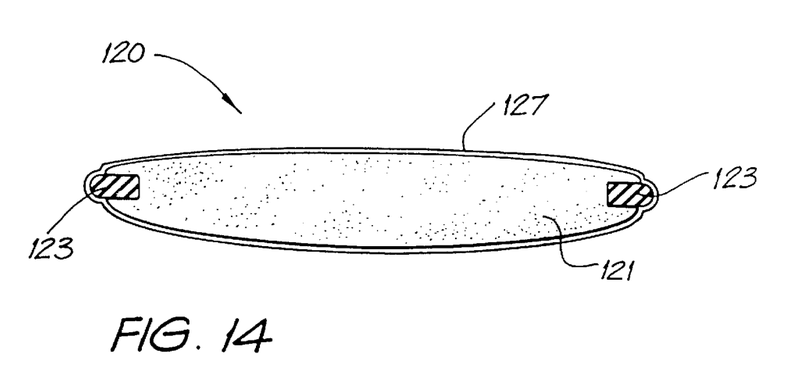
FIG. 14 is a transverse cross-sectional view through a surfboard or sailboard manufactured in accordance with the present invention.

Turning now to FIG. 14, it is important in modern surfboards and sailboards that a peripheral bead of soft resilient material extend around the edge of the board to prevent damage to humans in the event that the board should collide with a person in the water. In this further embodiment of the invention the body 121 of the board 120 can be formed from expanded foam such as EPS and be provided with a horizontally extending groove into which a soft rubber bead 123 is inserted. This arrangement forms a three layer horizontally extending stack formed from bead 123, body 121 and bead 123.

The entire board 120 is covered by sheet material 127 as before in order to encapsulate and maintain in position the members of the stack. The sheet material 127 when cooled is sufficiently flexible to permit the encapsulated bead 123 to still exhibit resilient, shock absorbing properties.

In addition, the techniques described above in relation to FIGS. 8 and 9 are useful in encapsulating a mast fitting in the case of sailboards or a leg rope fitting in the case of surfboards. Again, although a gap is illustrated in FIG. 14 between the board 120 and the sheet 127 to permit the sheet 127 to be seen in the drawing, no such gap actually exists.

Set out in tabular form below are various combinations of materials able to be used in the above described articles.

In the foregoing Table, as well known in the art, CARIL is a trademark for a blend of polyphenylene oxide and polystyrene impregnated with pentane, PETG is polyethylene terephthalate glycol, ABS is acrylonitrile butadiene styrene, HIPS is high impact polystyrene, SAN is polystyrene acrylonitrile, LDPE is low density polyethylene, HDPE is high density polyethylene, PMMA is polymethyl methacrylate, PBT is polybutyl terephthalate, PPE is polyphenylene ether, PVC is polyvinyl chloride, and NORIL is a trade name.

INTERIOR MATERIAL(S)
Expandable Polystyrene (EPS)
A blend of polyphenylene ether (PPE) and polystyrene (PS) impregnated with pentane (GECET—Trade Name)
A blend of polyphenylene ether (PPE) and polystyrene (PS) impregnated with pentane (CARIL—Trade Name)
Polyethylene (PE)
Polyurethane (PU)
Recycled or Virgin Cellulose Material (Paper, Cardboard, Timber)
Resins having mineral fillers including fly ash and aerated cement
Polypropylene (PP)
THERMOPLASTIC SHEET MATERIAL
Amorphorus Polyethylene Terephthalate (APET)
Polyethylene Terephthalate (PET)
Polyethylene Terephthalate Glycol (PETG)
Polycarbonate (PC)
Polycarbonate/Polybutylene Terephthalate (PC/Polyester)
Acrylonitrile Butadiene Styrene (ABS)
High Impact Polystyrene (HIPS)
Styrene Acrylonitrile (SAN)
Low Density Polyethylene (LDPE)
High Density Polyethylene (HDPE)
Polypropylene (PP)
Unplasticised Polyvinyl Chloride (Vinyl—UPVC)
Polymethyl Methacrylate (PMMA—Acrylic)
Cellulose Acetate
Poly Butylene Terephthalate (PBT)
Polyphenylene Ether (PPE)
Poly Formaldehyde (ACETAL)
Poly Vinyl Chloride (PVC)

Polyphenylene Ether alloyed with High Impact Polystyrene (NORYL—Trade Name)

It will be understood that each of the interior materials listed above can be coated with each of the sheet materials listed above.

The foregoing describes only some embodiments of the present invention and modifications, obvious to those skilled in the art, can be made thereto without departing from the scope of the present invention.

For example, a roofing tile fabricated from several layers of cardboard and encapsulated with the sheet material would be too light in weight to remain in position on a roof in high winds. To overcome this problem, the space between the corrugations of the cardboard can be filled with sand prior to encapsulation. This low cost strategy enables a roof tile of a comparable weight to a conventional ceramic or concrete roof tile to be produced.

What is claimed is:

1. A method of forming a layered structural article having load bearing capabilities from a plurality of shape defining interior members and at least one external skin, each of said plurality of shape defining interior members not being inherently load bearing and being at least partially fluid permeable, said method comprising:

(1) laminating a plurality of shape defining interior members to form a stack;
   (2) heating a thermoplastic sheet for forming an external skin of the layered structural article;
   (3) moving said thermoplastic sheet, while heated, relative to said stack, to bring said sheet, while heated, into a position overlying said stack;
   (4) applying a fluid pressure differential between a side of said sheet remote from said stack and a side of said stack remote from said sheet, to compress said plurality of members of said stack and conform said sheet to said stack and mutually engage said sheet and said stack compressed by the fluid pressure differential, air initially trapped between said stack and said sheet and within said stack passing through said stack; and
   (5) maintaining the fluid pressure differential on said stack until said thermoplastic sheet has cooled so that tensional forces arise in said sheet and extend in all directions.

2. The method as claimed in claim 1 including locating said stack on a perforated base plate.

3. The method as claimed in claim 1 wherein said base plate is curved in a direction opposed to curving of said stack brought about by the tensional forces in said sheet after cooling.

4. The method as claimed in claim 2 wherein said base plate has a pre-determined shape and said stack is conformed to the pre-determined shape.

5. The method as claimed in claim 1 wherein at least some of said stack members are different materials.

6. The method as claimed in claim 5 including perforating any of said stack members not formed from an inherently at least partially fluid permeable material.

7. The method as claimed in claim 1 locating a light between said stack and said sheet.

8. The method as claimed in claim 1 including
   (a) locating a fastener receiving apertured fitting between said stack and said sheet with an aperture of said fitting facing said sheet; and
   (b) clamping said fitting to said stack by the application of said sheet.

9. The method as claimed in claim 8 wherein the aperture is at least partially occluded by said sheet after cooling and including cutting away said sheet after cooling from the aperture to permit the aperture to receive a fastener.

10. The method as claimed in claim 8 wherein the aperture is in fluid communication with said stack and said sheet conforms to an interior of the aperture to permit the aperture to receive a fastener.

11. The method as claimed in claim 9 wherein the aperture is internally threaded for receiving a fastener that is externally threaded.

12. The method as claimed in claim 8 including heating a fitting and placing the fitting in contact with said sheet.

13. The method as claimed in claim 1 wherein said shape defining interior members are selected from the group consisting of:

Expanded Polystyrene;
   a Blend of Polyphenylene Oxide and Polystyrene impregnated with Pentane;
   Polyethylene;
   Polyurethane;
   Recycled or Virgin Cellulose Material Paper;
   Paper;
   Cardboard;
   Timber;
   Resins having mineral fillers including fly ash and aerated cement; and
   Polypropylene;

and said thermoplastic sheet material is selected from the group consisting of:

Amorphous Polyethylene Terephthalate;
   Polyethylene Terephthalate;
   Polyethylene Terephthalate Glycol;
   Polycarbonate;
   Polycarbonate/Polyester blends;
   Acrylonitrile Butadiene Styrene Polystyrene blends;
   high impact polystyrene Polystyrene blends;
   Styrene Acrylonitrile Polystyrene blends;
   Low Density Polyethylene Polystyrene blends;
   High Density Polyethylene Polystyrene blends;
   Polypropylene;
   Vinyl;
   Polymethyl Methacrylate Acrylic blends;
   Cellulose Acetate;
   Polybutyl Terephthalate;
   Polyphenylene Ether;
   Acetal; and
   Polyvinyl Chloride.

* * * * *